(12) United States Patent
Pepin et al.

(10) Patent No.: US 8,771,042 B2
(45) Date of Patent: Jul. 8, 2014

(54) OPTICAL FIBER POLISHING APPARATUS

(75) Inventors: Ronald P. Pepin, Georgetown, TX (US); Richard L. Simmons, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 402 days.

(21) Appl. No.: 13/144,029

(22) PCT Filed: Jan. 25, 2010

(86) PCT No.: PCT/US2010/021980
§ 371 (c)(1),
(2), (4) Date: Jul. 11, 2011

(87) PCT Pub. No.: WO2010/088184
PCT Pub. Date: Aug. 5, 2010

(65) Prior Publication Data
US 2011/0275283 A1  Nov. 10, 2011

Related U.S. Application Data

(60) Provisional application No. 61/149,107, filed on Feb. 2, 2009.

(51) Int. Cl.
*B24B 1/00* (2006.01)
*B24B 7/24* (2006.01)
*B24B 9/14* (2006.01)

(52) U.S. Cl.
USPC ............... 451/271; 385/85; 451/42; 451/357; 451/451; 451/533

(58) Field of Classification Search
CPC ............ B24B 5/04; B24B 5/047; B24B 7/16; B24B 7/167; B24B 9/007; B24B 13/00; B24B 13/04; B24B 19/16; B24B 19/226; B24B 47/12; B24B 55/055; B24B 55/04; B24B 7/24; B24B 29/00; B24B 23/04; G02B 6/25; B02B 6/3863
USPC .......... 385/85; 451/41, 42, 59, 271, 357, 451, 451/523, 524, 525, 533, 539
See application file for complete search history.

(56) References Cited

U.S. PATENT DOCUMENTS 3,069,815 A  12/1962 Valentine
3,975,865 A   8/1976 Lewis
(Continued)

FOREIGN PATENT DOCUMENTS

EP  1 293 295 A1  3/2003
JP  7-67663 B2    7/1995
(Continued)

*Primary Examiner* — Timothy V Eley
(74) *Attorney, Agent, or Firm* — Kristofor L. Storvick

(57) ABSTRACT

A polishing apparatus is provided for polishing an optical fiber connector. The optical fiber connector includes a connector housing and a ferrule. The polishing apparatus includes a mount to receive and hold the optical connector and a polisher housing supported by a base. The polisher housing houses a polisher that comprises a platen that supports a polishing media, the platen being coupled to a planetary gear system. The mount is disposed on a cover that encloses the polisher housing when the cover is placed in a closed position. A rotatable knob is exposed at an opening of the base, the rotatable knob being engaged with the planetary gear system to move the planetary gear system. The polishing media is disposed proximate to a fiber tip extending from an end face of the ferrule of the optical connector disposed in the mount when the cover is placed in the closed position.

19 Claims, 7 Drawing Sheets

(56) References Cited

U.S. PATENT DOCUMENTS

| | | | | |
|---|---|---|---|---|
| 4,178,722 | A | 12/1979 | Forman et al. | |
| 4,291,502 | A * | 9/1981 | Grimsby et al. | 451/271 |
| 4,766,705 | A | 8/1988 | Dholakia | |
| 4,979,334 | A * | 12/1990 | Takahashi | 451/271 |
| 5,007,209 | A | 4/1991 | Saito et al. | |
| 5,185,966 | A | 2/1993 | Mock, Jr. et al. | |
| 5,216,846 | A | 6/1993 | Takahashi | |
| 5,220,703 | A | 6/1993 | Kanayama | |
| 5,349,784 | A | 9/1994 | Grois et al. | |
| 5,351,445 | A * | 10/1994 | Takahashi | 451/271 |
| 5,408,558 | A | 4/1995 | Fan | |
| 5,447,464 | A | 9/1995 | Franklin et al. | |
| 5,464,361 | A | 11/1995 | Suzuki et al. | |
| 5,640,475 | A * | 6/1997 | Takahashi | 385/85 |
| 5,687,269 | A | 11/1997 | Furuya | |
| 5,727,989 | A | 3/1998 | Ohno et al. | |
| 5,743,787 | A * | 4/1998 | Ishiyama et al. | 451/41 |
| 5,768,738 | A | 6/1998 | Lee | |
| 5,813,902 | A | 9/1998 | Wiegand | |
| 5,876,269 | A * | 3/1999 | Torii | 451/41 |
| 6,099,392 | A | 8/2000 | Wiegand | |
| 6,190,239 | B1 | 2/2001 | Buzzetti | |
| 6,309,278 | B1 | 10/2001 | Suzuki et al. | |
| 6,443,827 | B1 * | 9/2002 | Ryoke et al. | 451/533 |
| 6,466,723 | B2 | 10/2002 | Miyake | |
| 6,951,508 | B1 | 10/2005 | Brubacher | |
| 7,476,279 | B2 | 1/2009 | Kida | |
| 7,552,500 | B2 | 6/2009 | Forrest, Jr. | |
| 8,540,553 | B2 * | 9/2013 | Bagley | 451/324 |
| 2001/0041512 | A1 | 11/2001 | Kato et al. | |
| 2002/0108636 | A1 | 8/2002 | Childers | |
| 2003/0036342 | A1 | 2/2003 | Yamada et al. | |
| 2003/0139118 | A1 | 7/2003 | Wetenkamp et al. | |
| 2004/0086251 | A1 | 5/2004 | Matsui et al. | |
| 2008/0119111 | A1 | 5/2008 | Zhang et al. | |
| 2008/0226236 | A1 | 9/2008 | Pepin et al. | |
| 2011/0117825 | A1 * | 5/2011 | Lin | 451/324 |

FOREIGN PATENT DOCUMENTS

| | | |
|---|---|---|
| JP | 09-061671 A2 | 3/1997 |
| JP | 10-170728 A2 | 6/1998 |
| JP | 2001-240849 A2 | 9/2001 |
| JP | 2005-212033 A2 | 8/2005 |
| WO | WO 2004/062849 | 7/2004 |
| WO | WO 2009/051918 A1 | 4/2009 |

* cited by examiner

OPTICAL FIBER POLISHING APPARATUS

CROSS REFERENCE TO RELATED APPLICATIONS

This application is a national stage filing under 35 U.S.C. 371 of PCT/US2010/021980, filed Jan. 25, 2010, which claims priority to U.S. Provisional Application No. 61/149,107, filed Feb. 2, 2009, the disclosure of which is incorporated by reference in its/their entirety herein.

BACKGROUND OF THE INVENTION

1. Field of the Invention

The present invention is directed to an apparatus and method for polishing an optical fiber, in particular, an optical fiber terminated and polished in the field.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the tip of the ferrule by adhesively securing the fiber within the bore of the ferrule. Another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber and the ferrule assembly may result in a non-contacting fiber tip when the temperature is raised, or lowered. The resulting gap can lead to significant reflection. A conventional remote grip connector is described in U.S. Pat. No. 5,408,558.

Another current practice involves a technician performing a field polish to create a fiber terminal end which protrudes beyond the ferrule tip. This method of polishing remote grip connectors produces a range of protrusions that provide a secure physical contact while avoiding excess force on the fiber tips. This method, when carefully followed, allows sufficient physical contact of the at least two fiber terminal end faces at temperatures for indoor applications (0° C. to 60° C.). However, the conventionally polished field-terminated remote grip connector may not be recommended for outdoor use, which has more stringent temperature requirements (−40° C. to 80° C.). Factors leading to unacceptable optical loss may result from the intrinsic variability of the field polishing process, craftsman error, over polishing (e.g. using too much force or too many strokes and coarse, clogged or contaminated abrasive) or substitution of a different type of abrasive.

The following references describe conventional devices for polishing optical fibers: U.S. 2003/0139118 A1; U.S. 2004/0086251 A1; U.S. 2008/0119111 A1; U.S. Pat. No. 3,975,865; U.S. Pat. No. 4,178,722; U.S. Pat. No. 4,291,502; U.S. Pat. No. 4,979,334; U.S. Pat. No. 5,007,209; U.S. Pat. No. 5,185,966; U.S. Pat. No. 5,216,846; U.S. Pat. No. 5,349,784; and U.S. Pat. No. 5,351,445.

SUMMARY

According to an exemplary aspect of the present invention, a polishing apparatus is provided for polishing an optical fiber connector. The optical fiber connector includes a connector housing and a ferrule. The polishing apparatus includes a mount to receive and hold the optical connector. The polishing apparatus includes a polisher housing supported by a base. The polisher housing houses a polisher that comprises a platen that supports a polishing media, the platen being coupled to a planetary gear system. The mount is disposed on a cover that encloses the polisher housing when the cover is placed in a closed position. A rotatable knob is exposed at an opening of the base, the rotatable knob being engaged with the planetary gear system to move the planetary gear system. The polishing media is disposed proximate to a fiber tip extending from an end face of the ferrule of the optical connector disposed in the mount when the cover is placed in the closed position. Moving the rotatable knob polishes the protruding fiber tip against the polishing media, for a predetermined travel distance.

According to another exemplary aspect of the present invention, a method of polishing an optical connector comprises providing an optical fiber having a stripped terminal end. The fiber is inserted through a connector body and a ferrule. A protrusion of the fiber tip from an end of the ferrule is set. The optical fiber is secured in the optical connector. The optical connector is mounted in a mount portion of a polishing apparatus, the polishing apparatus including a polisher that comprises a platen that supports a polishing media, the platen being coupled to a planetary gear system. The mount is disposed on a cover of the polisher housing that encloses the polisher when the cover is placed in a closed position. The method further includes turning a rotatable knob that engages the planetary gear system to move the planetary gear system, where the polishing media is disposed proximate to a fiber tip extending from an end face of the ferrule of the optical connector disposed in the mount when the cover is placed in the closed position. Rotating the knob polishes the protruding fiber tip against the polishing media over a predetermined travel distance. Further, the exposed fiber can be cleaved prior to setting the protrusion.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
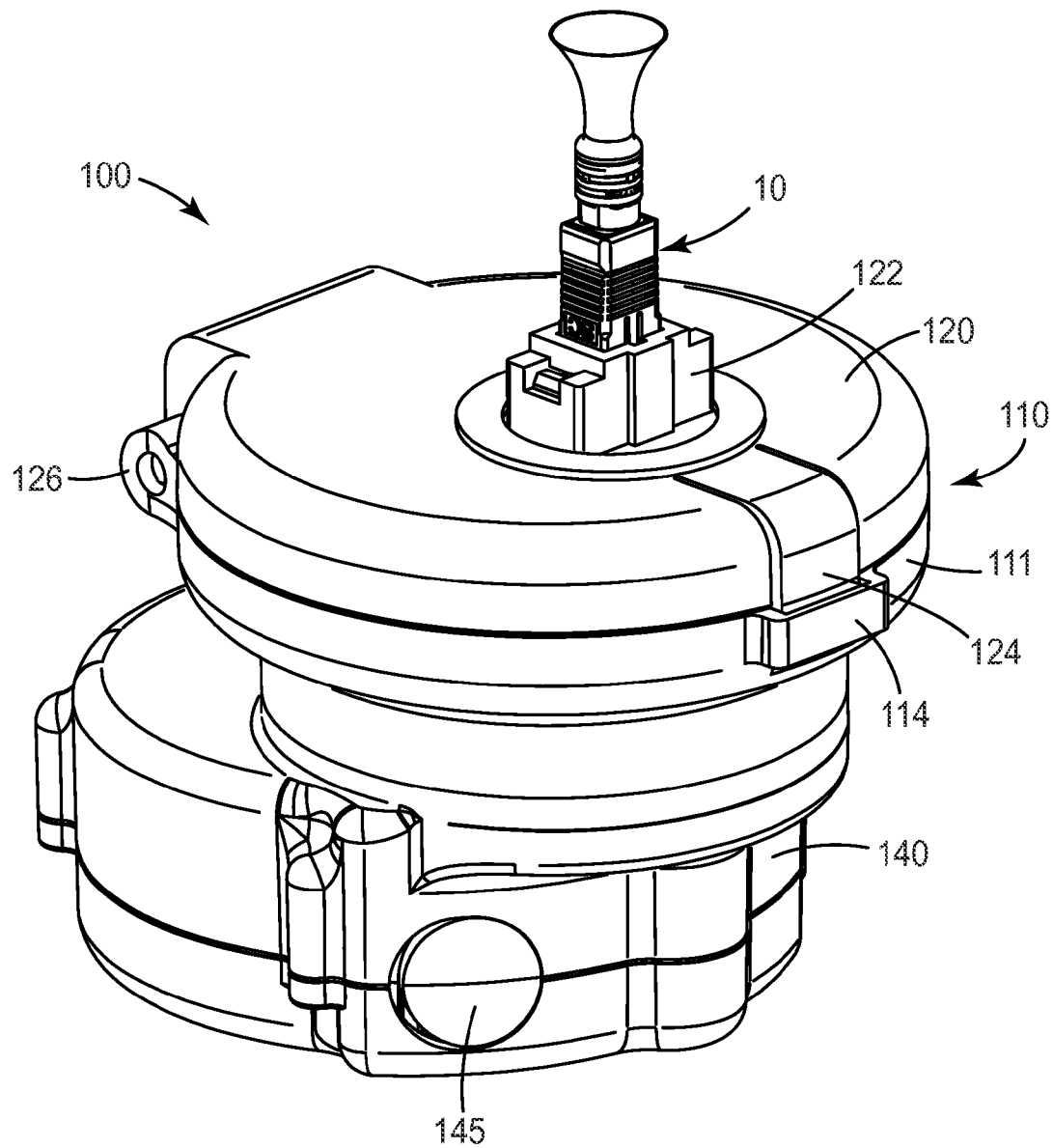
FIG. 1A is an isometric view of an exemplary polishing apparatus with its cover in a closed position according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an apparatus and method for polishing an optical fiber terminated in an optical fiber connector. As described herein, a simple method of field polishing and assembly of an optical connector can provide consistent, repeatable results and can substantially reduce the craft sensitivity, when contrasted with traditional field polishing methods, and can reduce connector installation costs. In a preferred aspect, the polishing apparatus can be a lightweight, hand-held, mechanical device that is operated manually in the field.

Figure 1B:
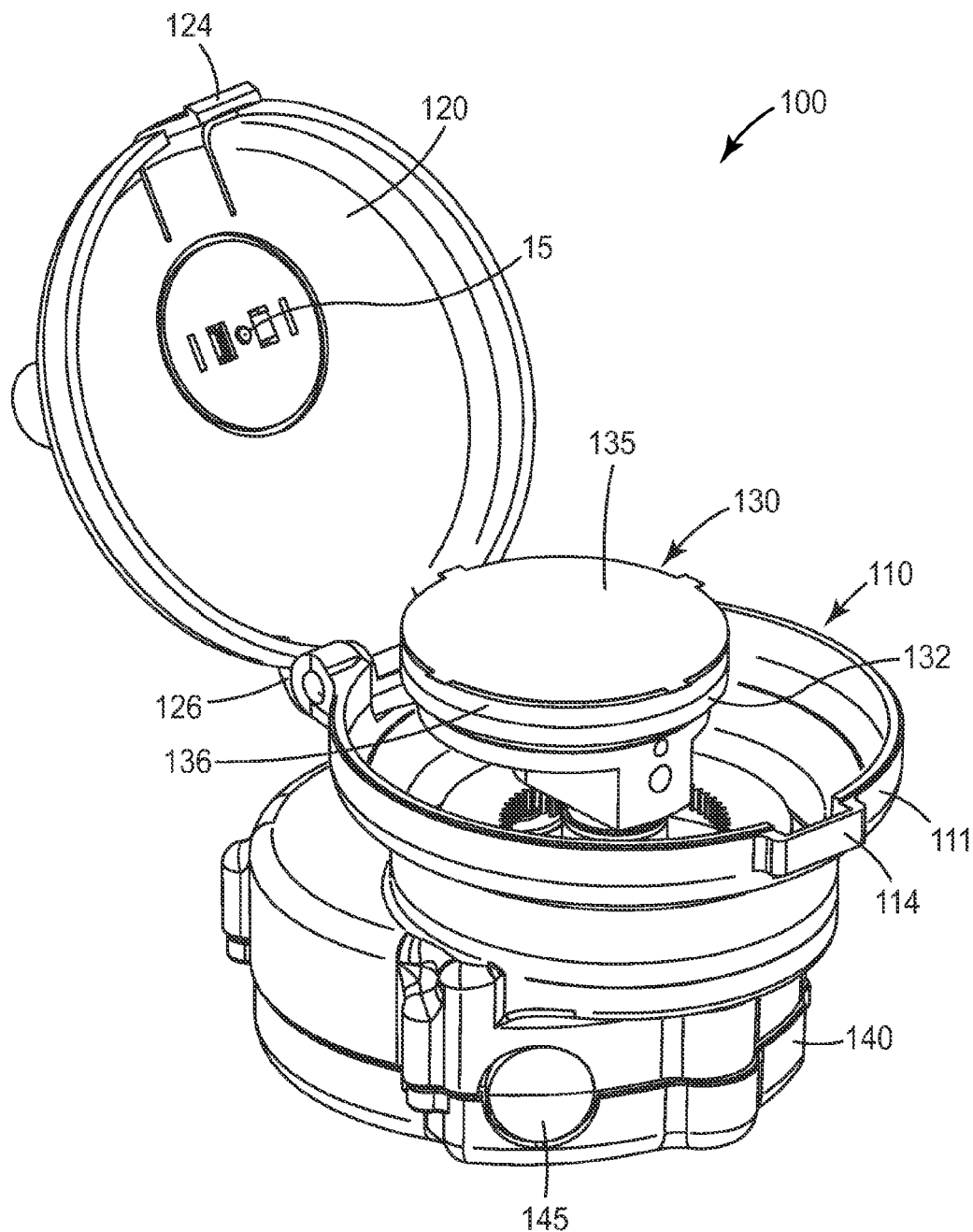
FIG. 1B is an isometric view of an exemplary polishing apparatus with its cover in an open position according to an aspect of the present invention.

FIGS. 1A and 1B respectively show closed and open views of an exemplary embodiment of the present invention, a polishing apparatus 100, and its components thereof. The polishing apparatus 100 includes a polisher housing 110 mounted on a base 140. The polisher housing 110 includes a connector mount 122 disposed on a cover 120 that is hingedly mounted on a general body 111. The connector mount 122 receives an optical fiber connector 10 having an optical fiber to be polished. FIG. 1A shows cover 120 placed in a closed position. A conventional latching mechanism 114, 124 can be used to secure the cover 120 in the closed position. A conventional hinge mechanism 126 can be utilized to allow the cover 120 to be repeatedly opened and closed over multiple operations.

As shown in FIG. 1B, with cover 120 placed in an open position, a polisher 130 is housed in the interior portion of polisher housing 110. The polisher 130 comprises a rotatable platen 132. In an exemplary aspect, the interior portion of the polisher 130 housing includes sufficient space to allow the rotatable platen to rotate and orbit during a polishing operation. In a preferred aspect, a polishing media 135, with one or more compliant backing pads 136, are disposed on platen 132. Other features of an exemplary polisher are described in more detail below.

The base 140 provides support for the polisher housing 110. The base 140 can comprise a one piece or a multi-piece construction, depending on manufacturing and molding considerations. The base 140 can also include one or more shaped structures or gripping materials disposed on an outer surface thereof to provide for straightforward handling by the user. The base 140 also includes an interior portion that houses the gears and other components of the polisher 130, as is described in more detail below. As is further shown in FIG. 1B, the base 140 includes an interlock button 145, which is press-activated for the polisher to operate.

The polisher housing 110 and base 140 can be constructed from a rigid material, such as a metal or a molded polymer (e.g., a glass or mineral filled plastic). While the polisher housing 110 and base 140 are shown as separate components, in an alternative aspect, the mount 110 and base 140 can be integrally formed as a single unit. In a preferred aspect, the polisher housing 110 and base 140 are sized such that the apparatus 100 is lightweight (e.g., less than 1 lbs., more preferably less than 0.5 lbs.) and can be held securely in one hand during operation.

Figure 6:
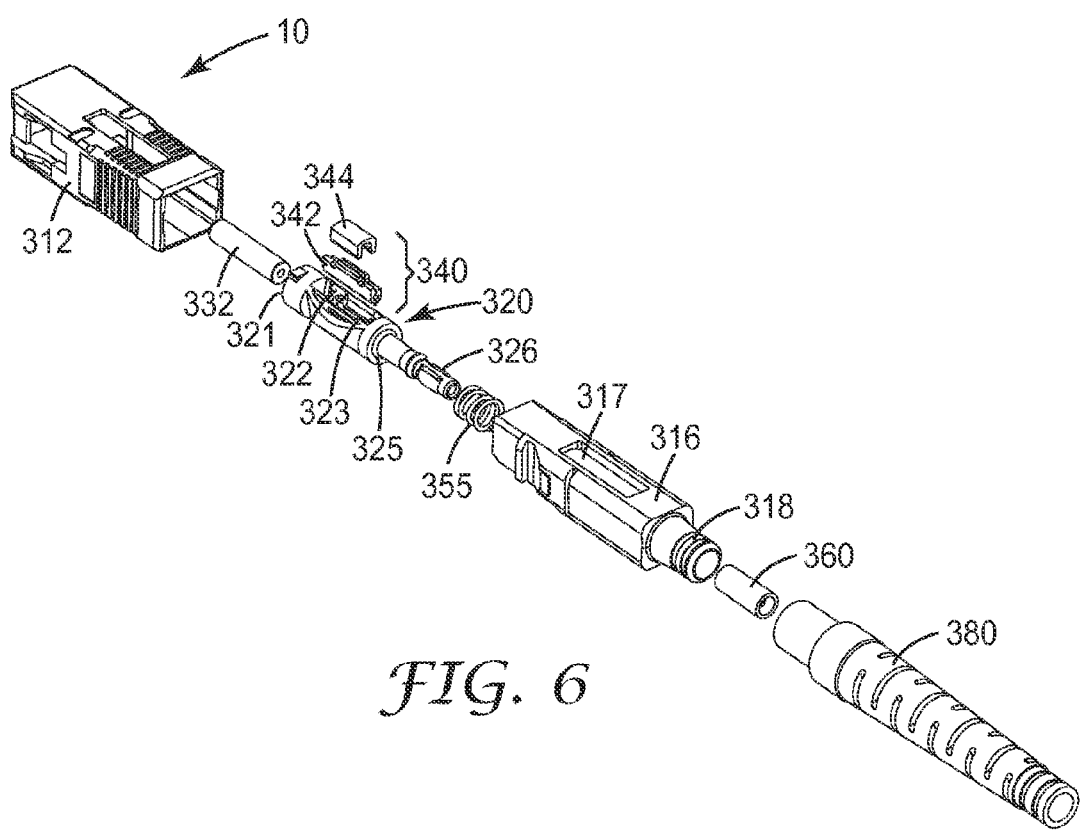
FIG. 6 is an exploded view of an exemplary optical fiber connector.

The connector mount 122 is configured to receive a conventional optical fiber connector. For example, a conventional connector can include a remote grip connector 10 (see e.g. FIG. 6). Such a connector 10 is described in detail in US Patent Publication No. 2008-0226236-A1, incorporated by reference herein in its entirety. This exemplary connector 10 includes a fiber connector housing 312 and having an optical fiber terminated in the connector ferrule 332. When the optical fiber connector 10 is mounted in mount 122, the mount 110 is configured to bring the ferrule face 15 (see e.g., FIG. 1B) and protruding fiber tip (not shown) into proximity of the polishing media 135 disposed on the platen 132. The mount 122 also secures the connector 10 in place to reduce potential movement caused by unintentional forces placed on the fiber cable or connector components. The structure of exemplary connector 10 and the polishing operation are described in more detail below. The optical cable can be a conventional cable such as a 250 μm or 900 μm buffer coated fiber, Kevlar reinforced jacketed fiber, or other sheathed and reinforced fibers.

In alternative aspects, the conventional connector 10 can include a Crimplok™ Connector available from 3M Company (St. Paul, Minn.), a 3M™ 8300 Hot Melt SC connector, or 3M™ 8206 FC/APC Connector (Epoxy) available from 3M Company (St. Paul, Minn.). In an exemplary aspect, the connector 10 can have an SC format. In other aspects, the polishing apparatus can be configured to receive a connector having another standard connector format, such as an LC format or an FC format. In a further alternative, the connector mount 122 can be configured to receive a connector having multiple fibers, such as an MT fiber connector.

The mount 122 is configured to releasably hold and secure optical fiber connector 10 and to provide a snug fit to hold connector 10, e.g., by a snap fit. Preferably, connector 10 can be held by the mount 122 at a predetermined angle. For example, the mount 122 can hold connector 10 for a flat polish) (0°), where the polishing media is perpendicular to the axial direction of the fiber, or, alternatively, an angled polish that is at a small angle (about 2° to about 12°) from perpendicular, to yield an angle-polished connector.

Referring to FIG. 1B, the polishing platen 132 is mounted to a gear mechanism that provides for a rotating and orbiting polishing surface 135. The polishing surface 135 can comprise a conventional polishing media or material. Depending on the type of polish, the polishing media 135 includes an abrasive material of larger grit size (e.g., 5-10 μm grit size) or a polishing media of a relatively finer grit-sized material (e.g., 0.02-0.05 μm grit size). For example, in one aspect, a circular piece of 3M 869XW lapping film (available from 3M Company, St. Paul Minn.) may be utilized. The polishing media 135 can be used in conjunction with a dry polish or a wet polish. After a polishing operation is completed, the polishing media 135 can be removed from the platen/backing and replaced with a new piece of polishing media 135 for the next polishing operation.

In a preferred aspect, the polishing media can be backed by one or more compliant pads 136. Although a single pad can also be utilized, in an exemplary aspect, compliant pad 136 comprises a first compliant pad 136a and a second compliant pad 136b (see FIG. 2). In a preferred aspect, first compliant pad 136a comprises a relatively thin pad (with a thickness of about 0.8 mm). First compliant pad 136a can comprise a relatively hard pad (e.g., having a Shore A durometer of about 60 to about 80, preferably a Shore A durometer of about 70). The first compliant pad 136a is disposed between the polishing media 135 and the second compliant pad 136b. In a preferred aspect, second compliant pad 136b comprises a relatively thick pad (with a thickness of about 3 mm). Second compliant pad 136b can comprise a relatively softer pad (e.g., having a Shore 00 durometer of about 30 to about 50, preferably a Shore 00 durometer of about 40). In this configuration, the second compliant pad 136b provides overall compliance and the first compliant pad 136a provides appropriate support for the polishing media 135.

In a further exemplary aspect, the appropriate contact force on the fiber tip being polished can be from about 100 grams force to about 150 grams force, preferably about 130 grams force, depending on the length of the protruding fiber and the abrasive media. The combination of contact force, compliance of the polishing surface and shape of the ferrule tip cooperate to help provide a desired shape on the polished fiber surface.

Figure 2:
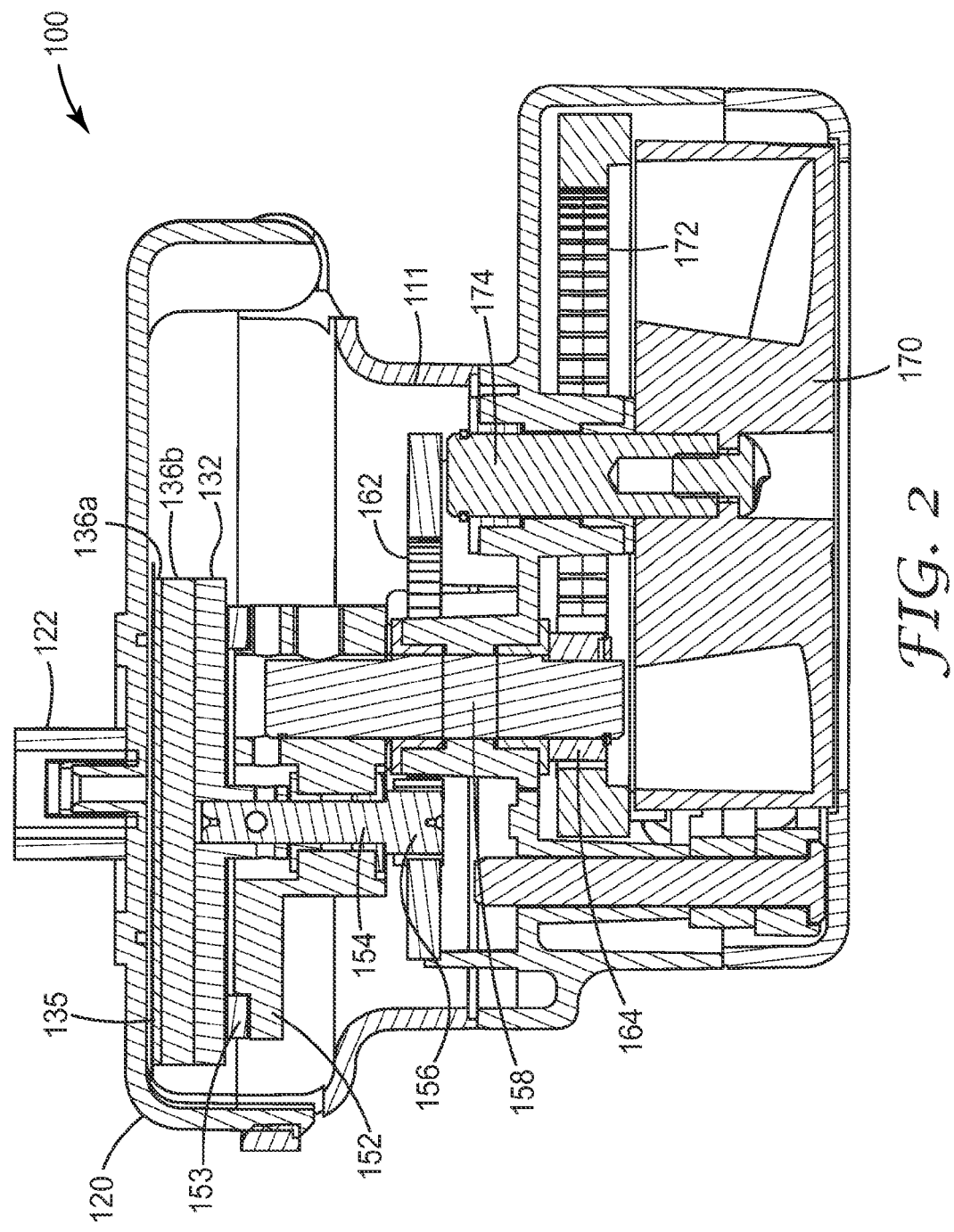
FIG. 2 is a section view of an exemplary polishing apparatus according to an aspect of the present invention.
Figure 3:
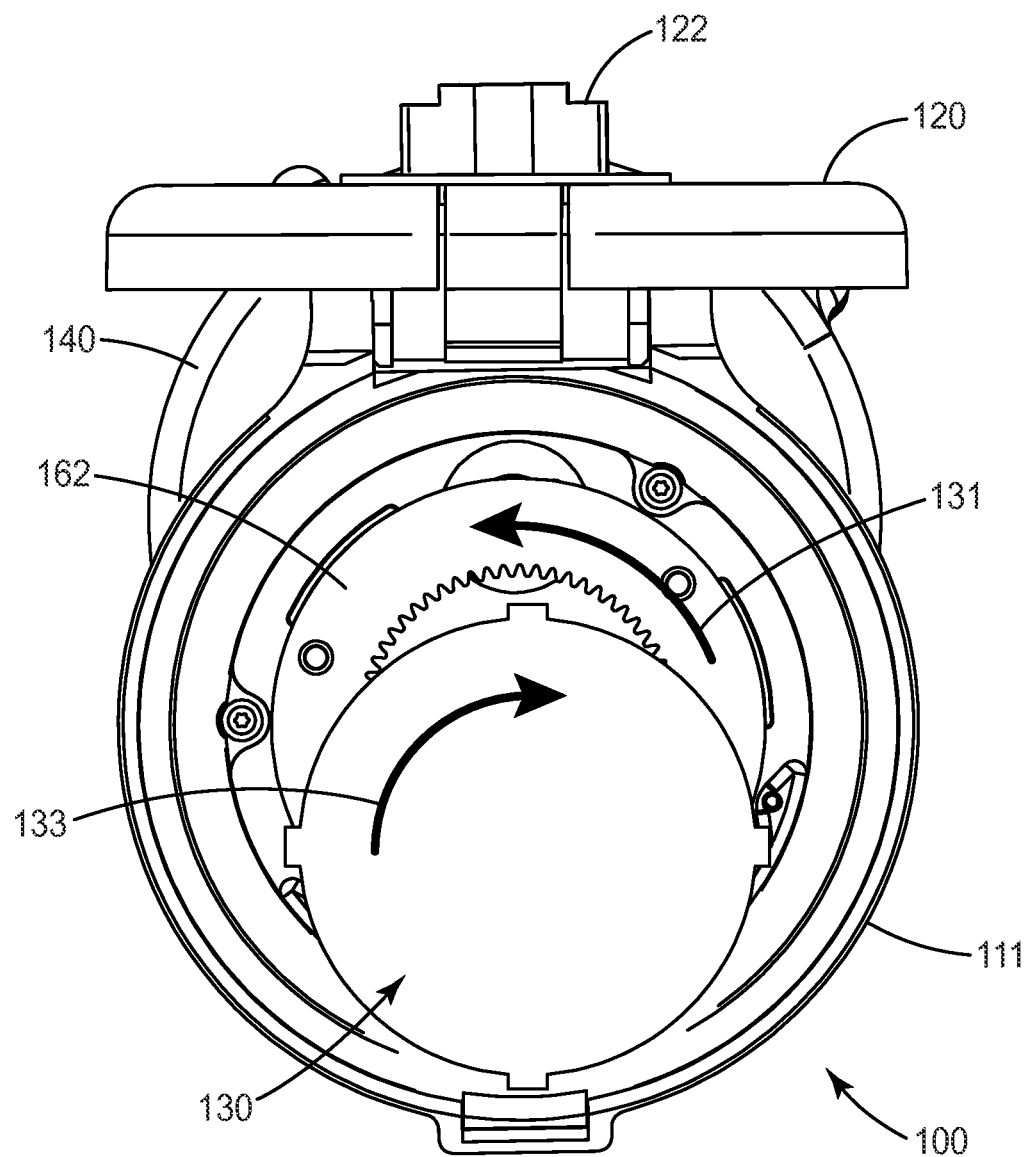
FIG. 3 is a top view of an exemplary polishing apparatus with its cover in an open position according to an aspect of the present invention.

As mentioned above, the polisher 130 comprises a rotatable platen 132. FIG. 2 shows a cross section view of an exemplary gear system used to provide the rotation of the polishing platen 132. FIG. 3 shows a top view of the apparatus 100 and polisher 130. Overall, the exemplary gear system is a conventional planetary gear system, which imparts a rotation and an orbit to the platen 132. In this exemplary aspect, a planet shaft 154 is coupled to the platen and provides a planetary type rotation (see arrow 133 in FIG. 3) as the planet drive shaft gear 156 engages with the planetary ring gear 162 during use. A thrust bearing 153 can be disposed between platen 132 and orbit arm 152 on the perimeter of orbit arm 152 to facilitate rotation of the platen 132 with a low friction over orbit arm 152. In addition, the platen 132 is provided with additional support by planetary orbit arm 152, which can reduce rocking by the platen 132 during polishing. For orbiting movement, a sun shaft 158 is coupled to the orbit arm 152 and rotates to provide orbital motion (see arrow 131 in FIG. 3), as the sun shaft drive gear 164 engages with the internal tooth drive gear 172 during use. The internal tooth drive gear 172 is in turn driven by an input knob 170, disposed at the bottom of the planetary gear system and the bottom of the base 140.

Figure 4:
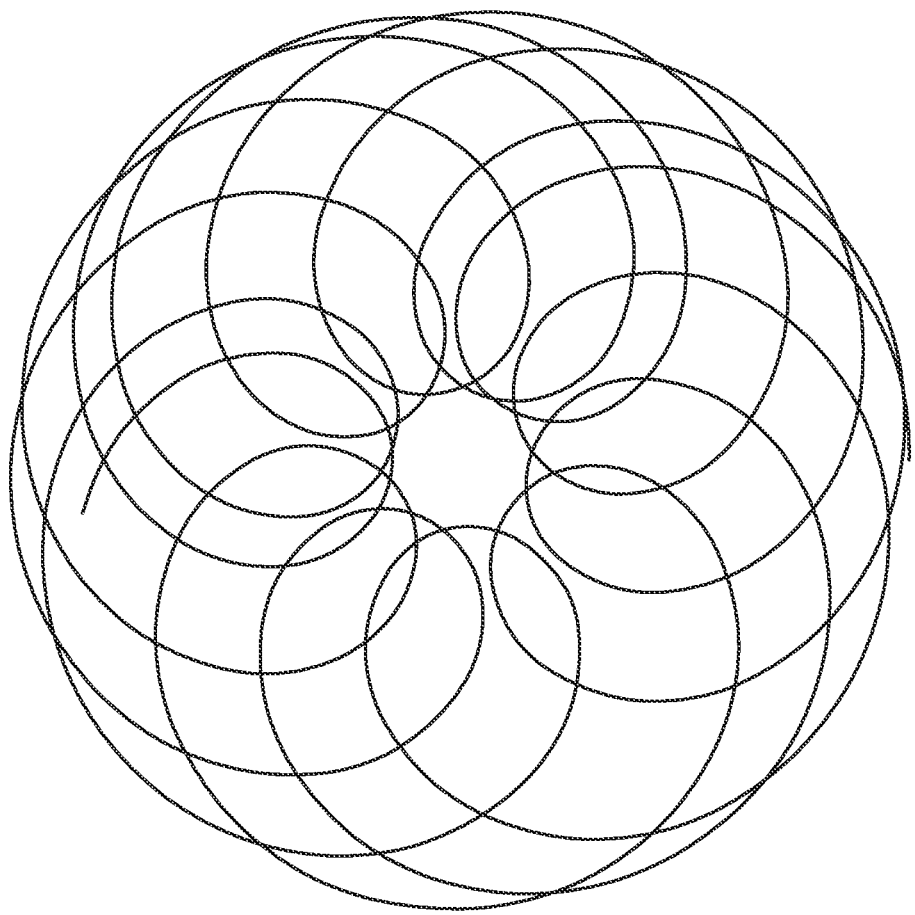
FIG. 4 is a view of an exemplary polishing pattern according to an aspect of the present invention.
Figure 5:
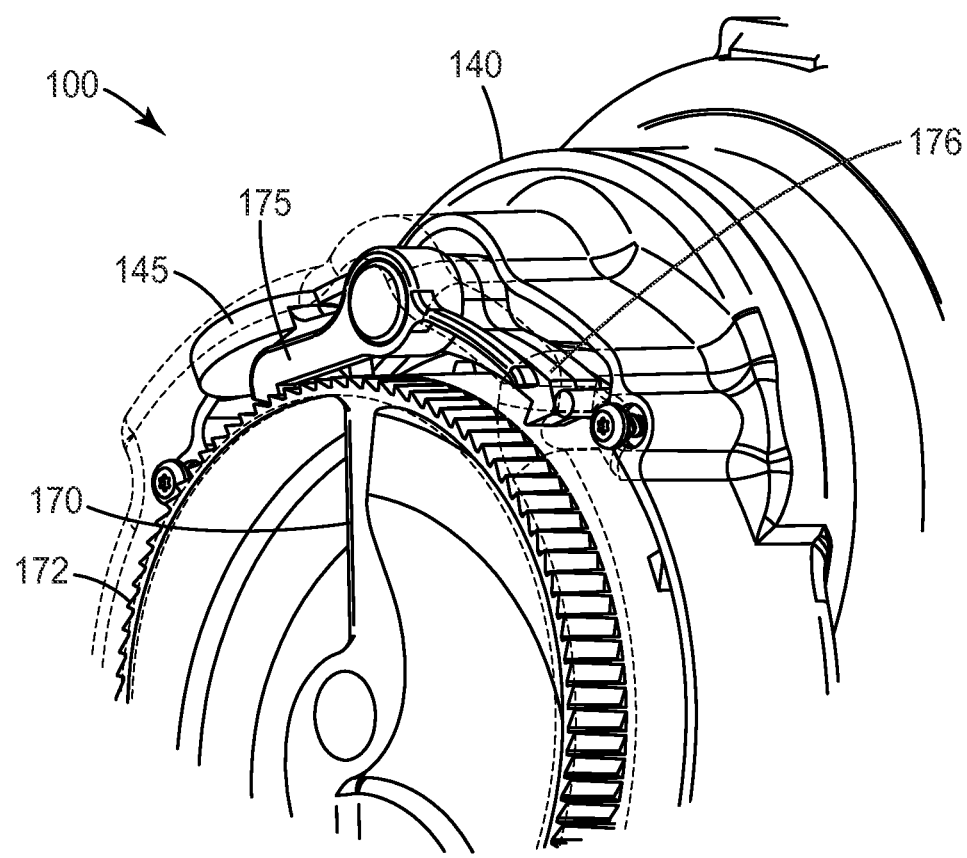
FIG. 5 is a close up isometric view of an interlock and ratchet mechanism according to an aspect of the present invention.

The input knob 170 is gripped by the user and rotated in a pre-selected direction to polish the connector. In an exemplary aspect, the input knob 170 is turned one revolution to impart the necessary orbits and rotations to the platen 132. In an exemplary aspect, as shown in FIG. 5, the apparatus 100 can include a ratchet mechanism 175 that engages the input knob 170 preventing reverse rotation. In addition, knob 170 can be designed to have sculpted finger recesses that are accessed by the user so that the knob 170 is only rotatable in one direction, thus helping to further maintain repeatable results. As a result, a polishing pattern similar to that shown in FIG. 4 can be realized. As can be noted from FIG. 4, the use of a planetary gear system can provide a pattern that is of sufficient length (e.g., up to a meter or more) without the pattern retracing itself.

In addition, as mentioned above, the apparatus 100 can provide consistent, repeatable results and can substantially reduce the craft sensitivity. In this manner, the interlock button 145 is press-activated to release the knob 170, allowing it to be rotated for one full turn. In one aspect, when the interlock button is depressed, as is shown in FIG. 5, a lever arm 176 is lifted and releases a cam or other structure formed on the outer wheel portion of knob 170. The lever arm 176 re-catches the cam or other structure after a full rotation to stop the rotation and reset the interlock button. Thus, the same polishing direction and travel can be the same for each individual polishing procedure.

While the exemplary embodiments of the polisher 130 described above reference a planetary gear system, other types of gearing can be utilized in alternative aspects. For example, the polisher gear can comprise a harmonic drive gear, a toothless friction cylinder in a hollow cylinder, or an o-ring friction structure driven in a hollow cylinder.

As mentioned above, FIG. 6 shows an exemplary remote grip optical fiber connector 10. Optical fiber connector 10 can include a connector body having a housing shell 312 and a fiber boot 380. In this exemplary embodiment shell 312 is configured to be received in an SC receptacle (e.g., an SC coupling, an SC adapter, or an SC socket). As mentioned above, other conventional connector formats can be utilized. The connector 10 also includes a backbone 316 that is housed inside the shell 312 and that provides structural support for the connector 10. In addition, backbone 316 further includes at least one access opening 317, which can provide access to actuate a gripping device disposed within the connector. Backbone 316 can further include a mounting structure 318 that provides for coupling to the fiber boot 380, which can be utilized to protect the optical fiber from bend related stress losses. Shell 312 is preferably secured to an outer surface of backbone 316 via snap fit.

Connector 10 further includes a collar body 320 that is disposed within the connector housing and retained therein. The collar body 320 is a multi-purpose element that can house a gripping device 340 and a fiber buffer clamp. In a preferred aspect, the connector 10 includes a displacement mechanism, such as an outer flexible wall or bowed walls formed on the collar body 320, that allows optical connector 10 to distribute contact forces in an appropriate manner so that the ferrule 332 and fiber each take on the correct amount of force when the connector is connected. The collar body 320 can include a shoulder 325 that can be used as a flange to provide resistance against a spring 355, interposed between the collar body and the backbone, when the ferrule 332 is inserted in, e.g., a receptacle. The collar body 320 includes a first end portion 321 having an opening to receive and house ferrule 332, which supports the optical fiber being inserted, polished, and terminated. The ferrule 332 can comprise a conventional glass-type or ceramic-type material, such as a zirconia or alumina material. The collar body 320 further includes a housing portion 323 that provides an opening 322 in which the gripping device 340 can be inserted in the central cavity of collar body 320. The gripping device 340 can include an element 342 and an actuating cap 344. Gripping element 342 is mountable in the housing portion 323 of collar body 320 such that it is substantially secured within a fixed element cradle or nest formed within the housing portion. Cap 344 is preferably configured to engage the gripping element 342 such that the element 342 grips a fiber inserted therein.

An exemplary method of the present invention provides a repeatable process that can lead to repeatable field polishing results. In particular, the following method can be employed to effectuate one or more field polished optical fiber connectors in a straightforward manner. In an exemplary aspect, the overall process includes stripping and cleaving the fiber cable, setting the fiber protrusion (distance between the fiber tip and the ferrule end face, and polishing the fiber tip. After polishing, the fiber tip can be cleaned.

In more detail, a strain relief boot (see FIG. 6, boot 380) can be threaded onto the fiber being polished. For thicker fiber jackets (e.g., 900 μm fibers), an additional crimp sleeve (not shown) can also be threaded onto the fiber prior to polishing. The connector 10 may or may not be seated in an installation tool or other holder prior to cleaving. Lengths of optical fiber cable can be prepared by removing a terminal portion (e.g., ~60 mm) of the cable jacket. The fiber can then be stripped of its buffer coating using a conventional fiber cable stripper such that the buffer coating extends about 15 mm beyond the cable jacket. The exposed glass tip portion can be cleaned using an alcohol (or other conventional cleaner) wipe.

The fiber can be positioned into a field cleaver, such as the cleaver described in PCT Publication No. WO 2009/051918, incorporated by reference herein in its entirety. A cleaving operation, using e.g., a diamond coated wire, can be performed using the field cleaver. This cleaver can produce a fiber tip having a cleave angle of between 0° to about 3.5° from perpendicular.

The cleaved fiber is then moved to a protrusion setting mechanism that sets the distance the fiber tip protrudes from the end of the ferrule. At this stage, the fiber can be guided into the remaining connector components until the fiber tip protrudes from about 50 μm to about 100 μm from the ferrule end. In an exemplary aspect, the protrusion setting mechanism comprises a setting jig having a ferrule-type end with a fixed step formed thereon. The setting jig is brought into contact with the connector 10 so that the stepped end of the setting jig contacts the end of the connector ferrule. This process sets the proper protrusion distance to the point where a slight bow in the fiber assures that fiber contact with the setting jig is maintained. A sufficient protrusion can be from about 15 μm to about 35 μm, with a preferable protrusion of about 25 μm. With the remote grip connector, the gripping element is then actuated using the actuator cap to secure the fiber position. In addition, buffer strain relief is activated using the buffer clamp portion of the connector 10. Optionally, when utilized, a crimping tool can be used to compress the crimp sleeve around the fiber jacket to secure the fiber cable in place after the fiber protrusion setting.

The connector 10 is thus ready for polishing and can be inserted in the connector mount 122 of the polishing apparatus 100. The polishing media 135 (e.g., a 863XW lapping film from 3M Company, a 869XW adhesive-backed lapping film from 3M Company, or other film per the application) can be placed onto the platen/backing pads and wetted with DI water or other conventional polishing fluid. The cover 120 can be closed onto the polisher housing 111 and secured in place by the latch. As described above, the compliant pad thickness and material selection can be utilized to produce a contact force on the fiber tip being polished of from about 100 grams force to about 150 grams force, preferably about 130 grams force. The interlock button 145 can be pressed to free the knob 170 so that it can be turned for one full revolution to a physical stop, as mentioned above, that prevents further rotation at the end of the turn. In one exemplary aspect, one full turn of the knob 170 corresponds to a travel distance (of the fiber tip over the polishing media) of about 0.9 meters. This polishing procedure can produce a polished fiber tip having a protrusion of about 20 μm (±9 μm) and a convex shape with an apex offset of ≤15 μm. After the polishing procedure, the fiber tip may be cleaned with an alcohol wipe.

For the next connector polishing operation, the polishing media 135 can be replaced with a new film and the apparatus is ready to repeat the same polish travel distance.

In an alternative aspect, more than one polishing media 135 can be utilized to polish a connector 10. For example, for an angle-polish, a first polishing media having a relatively coarse grit can be utilized. After the procedure described above is completed, the polishing media can be replaced by a polishing media of a relatively finer grit. The connector can remain in the connector mount, and the polisher can be closed and the rotatable knob can be turned to perform an additional polish on the same connector.

The exemplary embodiments described above can simplify the field polishing process, while controlling several sources of variability that have in the past led to a skill-level dominated practice. For example, the common "air polishing" practice of beginning a field polish while holding an abrasive polishing material in air (without any controlled backing force being applied) can be eliminated. Also, the field technician no longer must count strokes in a hand polishing process. The polishing apparatus can be a simple hand tool, without the need for a motor or power source. For certain connectors, such as described above, only a single polishing step would be needed.

While the invention above has been described mainly with respect to a single fiber remote grip connector using a mechanical fiber grip, the apparatus and method described herein may be used with a multi-fiber connector (e.g. a multi-fiber MT-type connector), and/or a remote adhesive grip, as would be apparent to one of ordinary skill in the art given the present description.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A polishing apparatus for polishing an optical fiber connector, the optical fiber connector including a connector housing and a ferrule, comprising:
   a mount to receive and hold the optical connector;
   a polisher housing to house a polisher that comprises a platen that supports a polishing media, the platen being coupled to a planetary gear system, wherein the mount is disposed on a cover that encloses the polisher housing when the cover is placed in a closed position;
   a base to support the polisher housing, wherein a rotatable input knob is accessible at a portion of the base, the rotatable input knob being engaged with the planetary gear system to move the planetary gear system, wherein the polishing media is disposed proximate to a fiber tip extending from an end face of the ferrule of the optical connector disposed in the mount when the cover is placed in the closed position; and
   a press-activatable interlock button, wherein the interlock button is depressed to release the rotatable input knob and permit rotation of the rotatable input knob for a predetermined rotation until the interlock is re-engaged to prevent further rotation.

2. The polishing apparatus of claim 1, wherein one or more compliant backing pads are disposed between the polishing media and the platen.

3. The polishing apparatus of claim 2, wherein the one or more compliant backing pads comprise a first compliant backing pad disposed between the polishing media and a second compliant backing pad.

4. The polishing apparatus of claim 3, wherein the first compliant backing pad has a thickness of about 0.8 mm and a hardness of about 60 to about 80 (Shore A) and the second compliant backing pad has a thickness of about 3 mm and a hardness of about 30 to about 50 (Shore 00).

5. The polishing apparatus of claim 1, wherein the fiber tip experiences a contact force of from about 100 grams force to about 150 grams force when the optical connector is disposed in the mount and the cover is placed in the closed position.

6. The polishing apparatus of claim 1, wherein the polisher housing and the base are integrally formed as a single unit.

7. The polishing apparatus of claim 1, wherein the connector is held in the mount at a predetermined angle, the predetermined angle providing for one of a flat polish that is perpendicular to the longitudinal direction of the fiber and an angled polish.

8. The polishing apparatus of claim 7, wherein the angled polish comprises an angle from perpendicular to the longitudinal direction of the fiber and an angled polish from about 2° to about 12°.

9. The polishing apparatus of claim 1, further comprising a ratchet coupled to the rotatable input knob to permit only one direction of rotation.

10. The polishing apparatus of claim 1, where in the optical fiber connector is a remote grip optical fiber connector.

11. The polishing apparatus of claim 1, where in the optical fiber connector is a multi-fiber optical fiber connector.

12. A polishing apparatus for polishing an optical fiber connector, the optical fiber connector including a connector housing and a ferrule, comprising:
   a mount to receive and hold the optical connector;
   a polisher housing to house a polisher that comprises a platen that supports a polishing media, the platen being coupled to a planetary gear system, wherein the mount is disposed on a cover that encloses the polisher housing when the cover is placed in a closed position;
   a base to support the polisher housing, wherein a rotatable input knob is accessible at a portion of the base, the rotatable input knob being engaged with the planetary gear system to move the planetary gear system, wherein the polishing media is disposed proximate to a fiber tip extending from an end face of the ferrule of the optical connector disposed in the mount when the cover is placed in the closed position; and
   a ratchet coupled to the rotatable input knob to permit only one direction of rotation.

13. The polishing apparatus of claim 12, wherein one or more compliant backing pads are disposed between the polishing media and the platen.

14. The polishing apparatus of claim 13, wherein the one or more compliant backing pads comprise a first compliant backing pad disposed between the polishing media and a second compliant backing pad.

15. The polishing apparatus of claim 14, wherein the first compliant backing pad has a thickness of about 0.8 mm and a hardness of about 60 to about 80 (Shore A) and the second compliant backing pad has a thickness of about 3 mm and a hardness of about 30 to about 50 (Shore 00).

16. The polishing apparatus of claim 12, wherein the fiber tip experiences a contact force of from about 100 grams force to about 150 grams force when the optical connector is disposed in the mount and the cover is placed in the closed position.

17. The polishing apparatus of claim 12, wherein the polisher housing and the base are integrally formed as a single unit.

18. The polishing apparatus of claim 12, wherein the connector is held in the mount at a predetermined angle, the predetermined angle providing for one of a flat polish that is perpendicular to the longitudinal direction of the fiber and an angled polish.

19. The polishing apparatus of claim 18, wherein the angled polish comprises an angle from perpendicular to the longitudinal direction of the fiber and an angled polish from about 2° to about 12°.

* * * * *